(12) United States Patent
Cozzo et al.

(10) Patent No.: US 9,949,260 B2
(45) Date of Patent: Apr. 17, 2018

(54) APPARATUS AND METHOD FOR TRANSMIT POWER CONTROL COMMAND TRANSMISSION

(71) Applicant: Futurewei Technologies, Inc., Plano, TX (US)

(72) Inventors: Carmela Cozzo, San Diego, CA (US); Peng Zhang, Shanghai (CN); Yueying Zhao, Shanghai (CN)

(73) Assignee: FUTUREWEI TECHNOLOGIES CO., LTD., Plano, TX (US)

( * ) Notice: Subject to any disclaimer, the term of this patent is extended or adjusted under 35 U.S.C. 154(b) by 0 days.

(21) Appl. No.: 15/331,788

(22) Filed: Oct. 21, 2016

(65) Prior Publication Data

US 2017/0118756 A1    Apr. 27, 2017

Related U.S. Application Data

(60) Provisional application No. 62/245,720, filed on Oct. 23, 2015.

(51) Int. Cl.
*H04B 7/00* (2006.01)
*H04W 72/04* (2009.01)
(Continued)

(52) U.S. Cl.
CPC ..... *H04W 72/0446* (2013.01); *H04W 52/146* (2013.01); *H04W 52/243* (2013.01);
(Continued)

(58) Field of Classification Search
CPC ..... H04W 7/022; H04W 52/24; H04W 52/40; H04B 7/022
(Continued)

(56) References Cited

U.S. PATENT DOCUMENTS 9,049,675 B2 *    6/2015    Yang ..................... H04W 52/40
2003/0119452 A1 *  6/2003    Kim ..................... H04W 52/143
                                                      455/69

(Continued)

FOREIGN PATENT DOCUMENTS

CN    102752842 A    10/2012
CN    103442401 A    12/2013
(Continued)

OTHER PUBLICATIONS

"3GPP TS 25.214 V11.3.0 (Technical Specification), 3rd Generation Partnership Project; Technical Specification Group Radio Access Network; Physical layer procedures (FDD) (Release 11) (Sep. 2012)", total 112 pages.

(Continued)

*Primary Examiner* — Tan H Trinh
(74) *Attorney, Agent, or Firm* — Futurewei Technologies Co., Ltd.

(57) ABSTRACT

A user equipment (UE) performing transmit power control (TPC) transmission slot assignment includes a receiver, a determining means and a slot allocator. The UE receives one or more TPC commands from two or more radio links, determines a TPC combining period in accordance with a primary slot position, wherein a primary TPC symbol transmission of the primary radio link is present at the primary slot position; a slot allocator that allocates a secondary slot position for a secondary TPC symbol transmission of the secondary radio link in accordance with the TPC combining period. A method and a radio base station are also included herein.

16 Claims, 9 Drawing Sheets

(51) Int. Cl.
*H04W 52/14* (2009.01)
*H04W 52/24* (2009.01)
*H04W 72/08* (2009.01)
*H04W 52/40* (2009.01)
*H04W 52/50* (2009.01)
*H04W 52/58* (2009.01)

(52) U.S. Cl.
CPC ........... *H04W 52/40* (2013.01); *H04W 52/50* (2013.01); *H04W 52/58* (2013.01); *H04W 72/082* (2013.01)

(58) Field of Classification Search
USPC ........ 455/69, 522, 436, 452.2, 453, 464, 10, 455/13.4, 509, 115.1, 135, 194.2, 245.1; 370/252, 311, 328, 329, 336, 295, 478, 370/242, 350
See application file for complete search history.

(56) References Cited

U.S. PATENT DOCUMENTS

| | | | |
|---|---|---|---|
| 2004/0087328 A1* | 5/2004 | Ronkainen | H04W 52/221 455/522 |
| 2005/0099968 A1* | 5/2005 | Yamano | H04W 52/58 370/311 |
| 2006/0246937 A1* | 11/2006 | Lindoff | H04W 52/146 455/522 |
| 2007/0191046 A1* | 8/2007 | Catreux-Erceg | H04W 52/56 455/522 |
| 2008/0214224 A1* | 9/2008 | Ostman | H04W 52/54 455/522 |
| 2009/0010281 A1* | 1/2009 | Kwon | H04L 5/0007 370/478 |
| 2009/0168750 A1* | 7/2009 | Pelletier | H04W 52/50 370/350 |
| 2009/0225699 A1* | 9/2009 | Takagi | H04W 28/22 370/328 |
| 2010/0041429 A1* | 2/2010 | Sidi | H04B 7/022 455/522 |
| 2010/0103847 A1* | 4/2010 | Karlsson | H04W 52/282 370/311 |
| 2010/0220606 A1* | 9/2010 | Niwano | H04W 52/54 370/252 |
| 2010/0254324 A1* | 10/2010 | Van Lieshout | H04W 52/286 370/329 |
| 2011/0149896 A1* | 6/2011 | Ofuji | H04J 13/00 370/329 |
| 2011/0164523 A1* | 7/2011 | Catreux-Erceg | H04W 52/241 370/252 |
| 2011/0200018 A1* | 8/2011 | Tazeh Mahalleh | H04L 5/001 370/336 |
| 2011/0319121 A1* | 12/2011 | Jen | H04L 5/001 455/522 |
| 2013/0044616 A1* | 2/2013 | Scholand | H04L 1/0027 370/252 |
| 2013/0322332 A1* | 12/2013 | Tsai | H04W 52/241 370/328 |
| 2014/0112155 A1* | 4/2014 | Lindoff | H04W 24/08 370/242 |
| 2014/0153462 A1* | 6/2014 | Matin | H04W 52/221 370/311 |
| 2014/0369312 A1* | 12/2014 | Yang | H04W 36/16 370/331 |
| 2015/0078284 A1* | 3/2015 | Lee | H04L 1/0026 370/329 |
| 2015/0094112 A1* | 4/2015 | Lampinen | H04W 52/325 455/522 |
| 2016/0094284 A1* | 3/2016 | Yum | H04B 7/0456 375/267 |
| 2016/0242128 A1* | 8/2016 | Loehr | H04W 52/365 |
| 2017/0086147 A1* | 3/2017 | Zhang | H04W 52/245 |

FOREIGN PATENT DOCUMENTS

| | | |
|---|---|---|
| CN | 104363975 A | 2/2015 |
| CN | 103874186 A | 6/2015 |

OTHER PUBLICATIONS

Search report issued in corresponding PCT application No. PCT/CN2016/103026, dated Oct. 24, 2016, total 4 pages.

\* cited by examiner

APPARATUS AND METHOD FOR TRANSMIT POWER CONTROL COMMAND TRANSMISSION

This application claims the benefit of U.S. Provisional Application No. 62/245,720, filed on Oct. 23, 2015, entitled "System and Method for Slot Assignment for TPC Transmission" which application is hereby incorporated herein by reference.

TECHNICAL FIELD

The present disclosure relates generally to telecommunications, and in particular to an apparatus and method for transmit power control command transmission.

BACKGROUND

Power control is the selection of transmitter power output in a communication system to enhance performance within a system. Increasing transmit power on a communication link has numerous benefits including a higher signal power at the receiver, allowing a system that uses link adaptation to transmit at a higher data rate and providing protection against signal fading.

However, increasing transmit power requires that more power be used by a system and may cause interference with outer systems. In communication systems, particularly communication systems such as wireless cellular systems, systems and methods which optimize the selection of transmit power are needed achieve the advantages of higher power communication links while avoiding unnecessary power draw and interference to other devices.

SUMMARY OF THE DISCLOSURE

Technical advantages are generally achieved, by embodiments of this disclosure which describe methods and systems for downlink transmit power control command transmission.

In accordance with an embodiment, a user equipment (UE) performing TPC transmission slot assignment is disclosed that includes a receiver that receives one or more TPC commands from two or more radio links. At least a primary radio link and a secondary radio link are among the two or more radio links are also disclosed with a determining means that determines a TPC combining period in accordance with a primary slot position. A primary TPC symbol transmission of the primary radio link is present at the primary slot position; and a slot allocator that allocates a secondary slot position for a secondary TPC symbol transmission of the secondary radio link in accordance with the TPC combining period.

In accordance with another embodiment, a method for transmit power control (TPC) transmission slot assignment includes receiving one or more TPC commands from two or more radio links is disclosed. In this embodiment, a primary radio link and a secondary radio link are among the two or more radio links. This method also includes determining a TPC combining period in accordance with a primary slot position where a primary TPC symbol transmission of the primary radio link is present at the primary slot position and allocating a secondary slot position for a secondary TPC symbol transmission of the secondary radio link in accordance with the TPC combining period.

In accordance with yet another embodiment, a UE performing transmit power control (TPC) transmission slot assignment is disclosed that includes a processor and a non-transitory computer readable storage medium storing programming for execution by the processor. The programming including instructions for receiving one or more TPC commands from two or more radio links, where at least a primary radio link and a secondary radio link are among the two or more radio links, determining a TPC combining period in accordance with a primary slot position. A primary TPC symbol transmission of the primary radio link is present at the primary slot position; allocating a secondary slot position for a secondary TPC symbol transmission of the secondary radio link in accordance with the TPC combining period.

In accordance with yet an embodiment, a radio base station performing transmit power control (TPC) transmission slot assignment is disclosed that includes a processor and a non-transitory computer readable storage medium storing programming for execution by the processor. The programming including instructions for being configured to transmit a TPC command in a first slot position; transmitting the TPC command in a third slot position in accordance with a TPC combining period, where the TPC combining period is determined in accordance with a primary slot position. A primary TPC symbol transmission of the primary radio link is present at the primary slot position.

Practice of the foregoing embodiments enables improved communication system capacity by considering the allocation of TPC transmission.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

Figure 1:
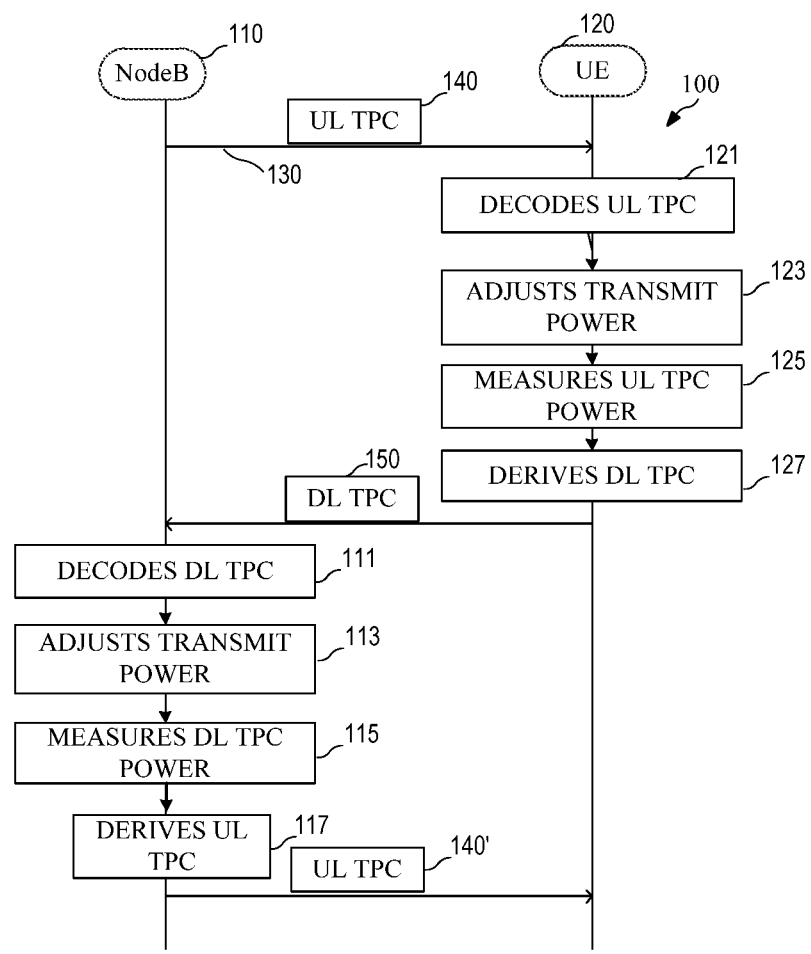
FIG. 1 illustrates an example communication system between NodeB and a UE.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

The initial uplink Dedicated Physical Control Channel (DPCCH) transmit power is generally set by a communication layer above the physical layer. Subsequently, the uplink transmit power control procedure controls the power of a DPCCH on each activated uplink frequency.

During the operation of the uplink power control procedure the UE transmit power generally does not exceed a maximum allowed value which is may be the lower out of the maximum output power of the terminal power class and a value which may be set by communication layer signaling which is higher than the physical layer.

Uplink power control can be performed while the UE transmit power is below the maximum allowed output power. A serving base station may exchange uplink and downlink transmit power control (TPC) commands with a served user equipment (UE) to adjust downlink transmit power levels over a radio interface, e.g. over a Universal Mobile Telecommunications System (UMTS) radio interface or the like. Downlink or uplink TPC is important for transmissions from the base station to the mobile station. Specifically, the base station varies its transmit power depending upon downlink transmit power control messages or commands sent by the mobile station, and the vice versa.

A serving base station may exchange uplink and downlink transmit power control (TPC) commands with a served user equipment (UE) to adjust downlink transmit power levels over a radio interface, e.g. over a Universal Mobile Telecommunications System (UMTS) radio interface or the like. Downlink or uplink TPC is important for transmissions from the base station to the mobile station. Specifically, the base station varies its transmit power depending upon downlink transmit power control messages or commands sent by the mobile station, and the vice versa.

The exchange of TPC between mobile stations and base stations may be carried through a Fractional Dedicated Physical Channel (F-DPCH). The TPC command carried on the F-DPCH from the serving base station to the served UE is called uplink (UL) TPC. The TPC command carried on the F-DPCH from the served UE to the serving base station is called downlink (DL) TPC. In particular, a serving base station may transmit a downlink TPC command in a downlink timeslot. A served UE may then receive the downlink TPC command from the serving base station, generate an uplink TPC command based on a received power level of the downlink TPC command, and transmit the uplink TPC command in an uplink timeslot that is mapped to, or otherwise associated with, the downlink timeslot over which the downlink TPC command was received. The uplink TPC command may instruct the serving base station to adjust its downlink transmit power level based on the received power level of the downlink TPC command, which may correspond to a variation in channel quality of the serving radio interface over time. To adjust the TPC level may refer to increase or decrease the power level accordingly.

As per the technical specification of the $3^{rd}$ Generation Partnership Project (3GPP) (3GPP TS 25.214 V07.04.00 and section 5.1.2.2.1), when an UpLink Discontinuous Transmission mode (UL_DTX_mode) is set to 1, a Transmit Power Control (TPC) command does not have to be transmitted in any downlink slot starting during an uplink Dedicated Physical Control CHannel (DPCCH) slot, which is in an uplink DPCCH transmission gap (as defined in subclause 6C.2 of the aforementioned 3GPP specification, which is hereby incorporated by reference as if reproduced in full).

An F-DPCH carries control information generated at a first layer for an uplink and downlink Dedicated Physical Control Channel (DPCCH) associated with the F-DPCH by a higher layer than the first layer signaling. It can be referred as a special case of downlink/uplink DPCCH. The frame structure of the F-DPCH can be described as having a length 10ms and may be split into 15 slots, with each of length $T_{slot}=2560$ chips, corresponding to one transmit power-control period.

As used herein, the term "base station" refers to any component (or collection of components) configured to provide wireless access to a UE, such as an enhanced base station (eNB), a NodeB, a radio base station, a macro-cell, a femtocell, a cell, a Wi-Fi access point (AP), or other wirelessly enabled devices. Base stations may provide wireless access in accordance with one or more wireless communication protocols, e.g., long term evolution (LTE), LTE advanced (LTE-A), WCDMA, High Speed Packet Access (HSPA), Wi-Fi 802.11a/b/g/n/ac, etc. As used herein, the term "UE" refers to any component (or collection of components) capable of establishing a wireless connection with a base station, such as LTE-enabled UEs, Wi-Fi mobile station (STAs), and other wirelessly enabled devices. In some embodiments, the network 100 may comprise various other wireless devices, such as relays, low power nodes, etc.

FIG. 1 illustrates an example communication system between a NodeB 110 and a UE 120 according to example embodiments described herein.

The NodeB 110 sends an uplink TPC content to the UE 120 through an F-DPCH 130, the F-DPCH 130 may be referred as a radio link (RL); the UE 120 receives the UL TPC, decodes the UL TPC 121 content and adjusts the transmission power 123 according to the TPC content. The content of the UL TPC command is used to adjust the transmit power of a UE receiving that UL TPC command. The UE 120 measures the power of the received UL TPC power 125 symbols and the UE 120 derives a downlink (DL) TPC 127 content and sends the DL TPC in the uplink to the NodeB 110 through the F-DPCH.

The NodeB 110 receives the DL TPC 150 symbols carrying the TPC content, decodes the DL TPC 111 content and adjusts the transmission power 113 of the TPC symbols according to the TPC content. The NodeB 110 measures the DL TPC power 115 and the NodeB 110 derives a UL TPC 117 content and sends the UL TPC 140 content to the UE 120 through the F-DPCH.

In conventional networks, base stations may transmit downlink TPC commands in each downlink timeslot, as well as receive uplink TPC commands in each uplink timeslot. If an uplink TPC command is not received, then a legacy base station may perceive that an error has occurred. This mode for TPC command transmission may be referred to as Algorithm 1 or Algorithm 2 as of a power control algorithm. These algorithms are described in detail in 3GPP TS 25.214, including 3GPP TS 25.214 version 11.3.0 Release 11 (2012-009) section 5.1.2.2.

In next-generation networks, base stations may reduce overhead by communicating downlink TPC commands less frequently. For example, every third timeslot, or every fifth timeslot etc. This can be applied in situations where the serving radio interface is relatively stable, e.g., when a UE is exhibiting low mobility, etc. This mode may be referred to as "Algorithm 3". When Algorithm 3 is configured on the serving radio link, a downlink TPC command as well as an uplink TPC command is not transmitted in each timeslot. For example the TPC command may be transmitted once every three or five downlink or uplink timeslots depending on the slot cycle. In applying Algorithm 3, base stations may reduce overhead by communicating downlink TPC commands less frequently, which will save the code resource and reduce the power consumption of control channels in the transmission.

Figure 2:
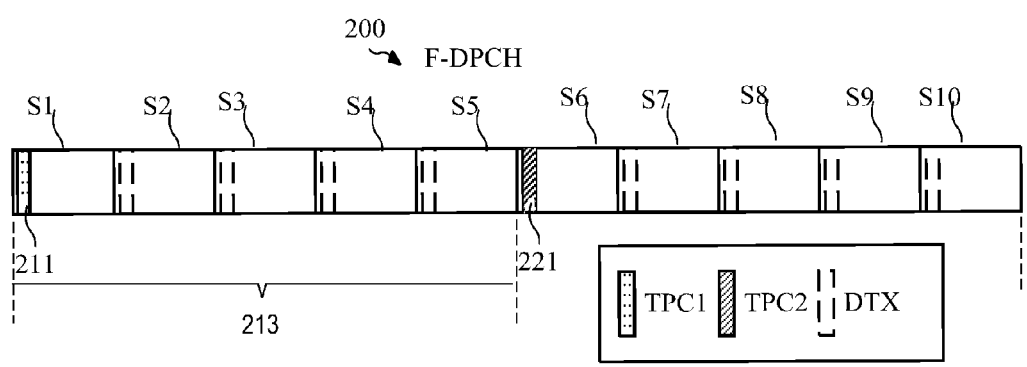
FIG. 2 illustrates an example for a TPC command transmission configured with Algorithm 3 on an F-DPCH.

FIG. 2 illustrates an example for a TPC command (211, 221) transmission configured with Algorithm 3 on an F-DPCH 200 according to example embodiments described herein. An F-DPCH is referred as a radio link for a network transmission. Algorithm 3 is configured on the radio link. TPC commands are transmitted in timeslot carrying by the F-DPCH. Algorithm 3 assumes that the TPC command is not transmitted in every slot, which may be referred as a discontinuous transmission (DTX). FIG. 2 shows that only one TPC command is transmitted with an N-slot period 213, where N is 5 in this example. For other slots, no TPC command is transmitted. TPC1 211 is transmitted in slot 1 and TPC2 221 is transmitted in slot 6. Slots 2-5 and Slots 7-10 do not carry TPC thus is shown as DTX slots in TPC transmission. In the slots where no TPC commands are transmitted, same power is transmitted as the power of the slots with the TPC commands, thus code resource can be saved and the power consumption of control channels can be consumed fully for the transmission.

The control information is only transmitted on e.g. the first channel while DTX bits are transmitted during the corresponding time period for the additional channels. Such transmission can be set as a relationship in the network control between the TPC symbol and the transmit power control command.

When more TPC commands of radio links to be transmitted for a network communication, transmission configuration counts for the resource allocation. Especially when code resource is valuable for the entire network, to save power consumption is the goal for the environment energy.

When a UE is in soft handover, multiple TPC commands may be received in each slot in which a TPC command is known to be present from different cells (or RLs). When all RLs are configured with Algorithm 3, the TPC commands from all RLs may be allocated within one slot so that the TPC combining period has a length equal to one slot.

Various embodiments are directed to the assignment of the slot in which the TPC command is transmitted when Algorithm 3 is configured and the UE is in soft handover. The other slots may not carry the TPC command.

When Algorithm 3 for TPC command combining is configured, the TPC command combining period is determined by the slot in which the TPC command is transmitted from the primary radio link. The TPC command from the other secondary radio links are transmitted within the TPC command combining period determined by the primary radio link. The TPC combining period when Algorithm 3 is configured are not consecutive, i.e. discontinuously transmitted, because TPC commands are not present in every slot. The slot in which the TPC command is transmitted may depend on the slot format of the F-DPCH transmitted from the primary RL and the secondary RL(s). The primary RL can be determined by the network and the UE. The primary radio link may belong to the reference cell, which is determined by the network. There may be one single TPC combining period within a pre-determined number of slots. The pre-determined number of slots may be equal to the number of slots in the slot cycle.

Figure 3:
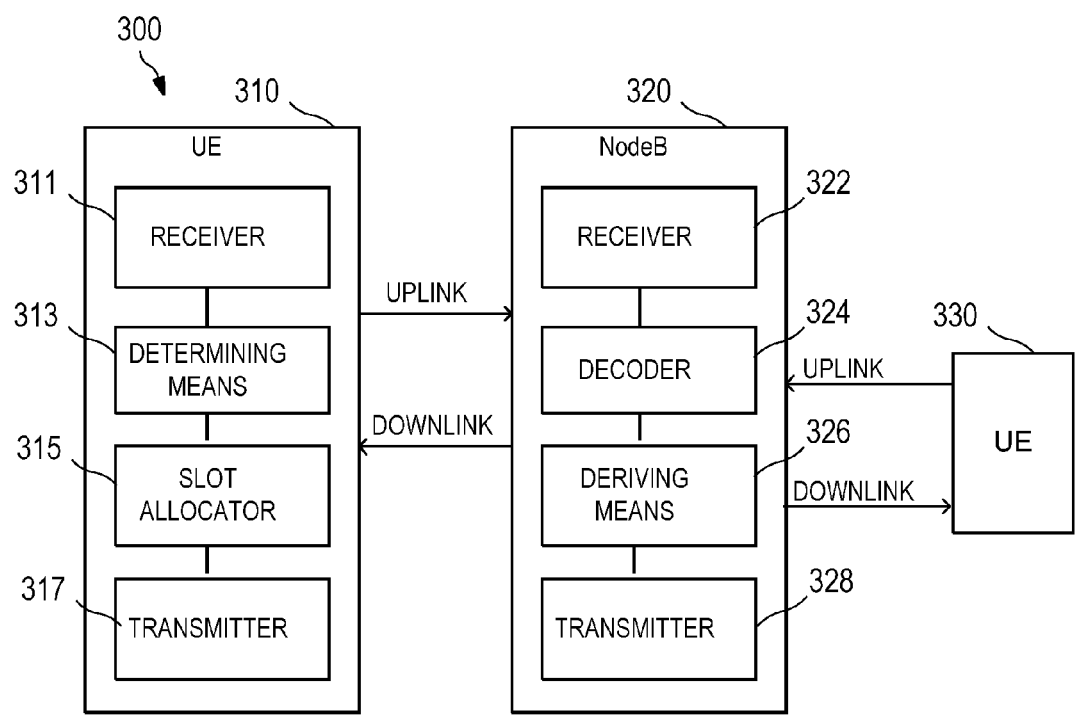
FIG. 3 illustrates a block diagram of a system of TPC transmission including a UE and a NodeB.

FIG. 3 illustrates a block diagram of a system 300 of TPC transmission including a UE 310, a NodeB 320 and a UE 330 according to example embodiments described herein.

The UE 310 performs TPC transmission slot assignment includes a receiver 311 that receives one or more TPC commands from two or more radio links, wherein at least a primary radio link and a secondary radio link are among the two or more radio links; a determining means 313 that determines a TPC combining period in accordance with a primary slot position, wherein a primary TPC symbol transmission of the primary radio link is present at the primary slot position; a slot allocator 315 that allocates a secondary slot position for a secondary TPC symbol transmission of the secondary radio link in accordance with the TPC combining period.

Preferably, the primary radio link is an existing radio link, and the secondary radio link is added later.

Preferably, when the primary and the secondary radio links are configured with Algorithm 3, the receiver 311 receives the TPC command of the secondary radio link in the TPC combining period, wherein the TPC combining period is determined by the primary slot position carrying the primary TPC symbol transmission. Optionally the TPC combining period exists before receiving the TPC command of the secondary radio link.

Preferably, wherein at least one of the primary radio link and the secondary radio link is configured with Algorithm 3, and the TPC combining period exists only once in each slot cycle, wherein the secondary slot position for the secondary TPC symbol transmission of the secondary radio is within the TPC combining period.

Preferably, wherein the determining means 313 further determines a first slot position from which the TPC combining period starts in accordance with the primary slot position.

Optionally, a third radio link is added and follows the same procedure of TPC combining as the one for the secondary radio link. More radio links are added like this way.

Optionally, when the position in accordance with the TPC combining period is available for the secondary TPC symbol transmission of the secondary radio link, a code to transmit the secondary symbol is used as same as the code used in the primary radio link.

Optionally, a transmitter 317 that transmits the secondary TPC command of the secondary radio link not at the same time as transmitting the primary TPC command of the primary radio link.

The NodeB 320 includes a receiver 322, a decoder 324, a deriving means 326 and a transmitter 328. The receiver 322 receives the DL TPC symbols carrying the TPC content from the UE 310; the decoder 324 decodes the DL TPC content; the NodeB 320 then adjusts the transmission power of the TPC symbols according to the TPC content, and measures the DL TPC power; then the deriving means 326 of the NodeB derives a UL TPC content. The transmitter then may send the UL TPC content to the UE 310, or the UE 330 through an F-DPCH.

The slot in which the TPC command is transmitted when Algorithm 3 is configured and the UE is in soft handover depends on a slot format of the F-DPCH transmitted from the primary radio link and the secondary radio link or radio links. The UE combines the multiple commands received within the TPC command combining window.

Upon reception of one or more TPC commands in a TPC command combining period, the UE 310 may derive a single TPC command, e.g. TPC_cmd, for each TPC command combining period in which a TPC command is known to be present, combining multiple TPC commands if more than one is received in a TPC command combining period. The TPC command combining period may have a length of one slot, beginning at the downlink slot boundary for F-DPCH or a DPCH. The TPC combining periods when Algorithm 3 is configured are not consecutive because TPC commands are not present in every slot.

Figure 4:
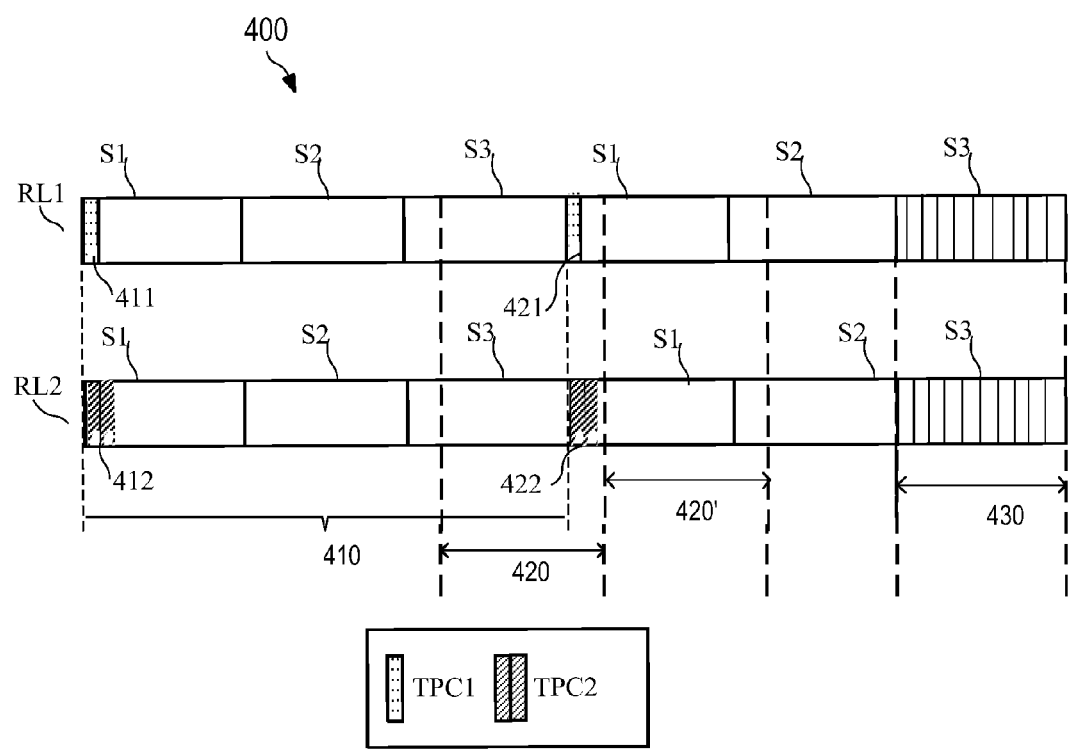
FIG. 4 illustrates an example TPC transmission.

FIG. 4 illustrates an example TPC transmission according to example embodiments described herein. FIG. 4 shows the F-DPCH of RL1 and RL2. RL1 is a primary radio link. RL2 is a secondary radio link. RL1 transmits the TPC command 411, 421 in the first symbol of slot S1. RL2 transmits the TPC command 412, 422.

The TPC combining period is determined by the primary RL TPC command position, hereby is the position of the RL1 TPC 411, 421. There may be only one TPC combining period 420 from the third slot of slot cycle n to the first slot of slot cycle n+1, n here refers to 3 as shown in FIG. 4. For example a slot period 410 includes three slots.

Combining the TPC symbols of additional radio links with the primary radio link, the position of the additional TPC symbols are allocated into the positions within the combining period which is set by the position of the TPC symbols of the primary radio link. For example, when combining the TPC symbols of RL2 with RL1, if in RL2, the TPC symbols 412 are allocated in the first slot S1, then only the two symbol positions as referenced by number 422 may be used for RL2. The TPC symbols 412 cannot be allocated in the other eight positions of the first slot S1 because they might be outside the TPC combining period 420 where the TPC command 421 from RL1 is present. If in RL2, the TPC symbols 412 are allocated to the first two positions in the third slot S3, then eight additional positions in the third slot S3 are possible for the transmission of the TPC command 422.

A network controller, or a NodeB, or a UE may decide in which slot to transmit the TPC commands from RL2 and which slot format to use for RL2. As an example:

If RL1 slot format={9,0}, then
If RL2 slot format={1, . . . , 8} then RL2 may transmit the TPC command in the third slot;
If RL2 slot format={9, 0} then RL2 may transmit the TPC command in the first slot.

Note that slot format={1, . . . , 8} indicates that the slot format number for F-DPCH can be any number from 1 to 8; and slot format ={9,0} indicates that the slot format number of F-DPCH can be 9 or 0.

Figure 5:
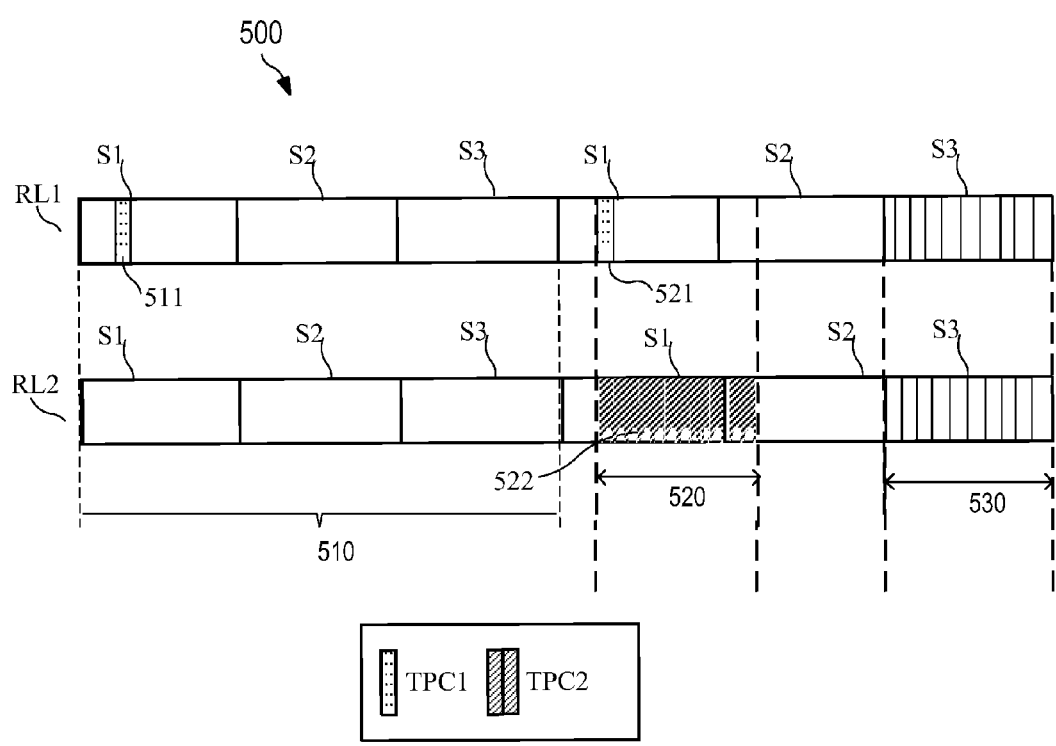
FIG. 5 illustrates an example TPC transmission.

FIG. 5 illustrates an example TPC transmission according to example embodiments described herein. FIG. 5 shows the F-DPCH of RL1 and RL2. RL1 is a primary radio link. RL2 is a secondary radio link. RL1 transmits the TPC command 511, 521 in the third symbol of slot S1. RL2 transmits the TPC command 520. The TPC combining period is determined by the primary RL TPC command position, hereby is RL1 for example.

RL1 is the primary RL and it transmits the TPC command in the third symbol of the slot S1 as shown in FIG. 5. There is only one TPC combining period 520 from first slot to second slot for each slot cycle, as shown in FIG. 5.

If in RL2 the TPC symbols 520 can only be allocated in the first slot S1, then there are eight symbol positions that can be used by RL2 to transmit the TPC command. The first two positions in the first slot S1 cannot be used because they are outside the TPC combining period where the TPC command from RL1 is present.

If in RL2 the TPC symbols 520 can be allocated to the second slot, then two additional positions, shown in the second slot S2 are possible for the transmission of the TPC command 520.

As an example:
If RL1 slot format={1, . . . , 8}, then
If RL2 slot format={1, . . . , 8}, then RL2 transmits the TPC command in the first slot;
If RL2 slot format={9, 0}, then RL2 transmits the TPC command in the second slot.

Note that slot format={1, . . . , 8} indicates that the slot format number for F-DPCH can be any number from 1 to 8; and slot format={9,0} indicates that the slot format number of F-DPCH can be 9 or 0.

Figure 6:
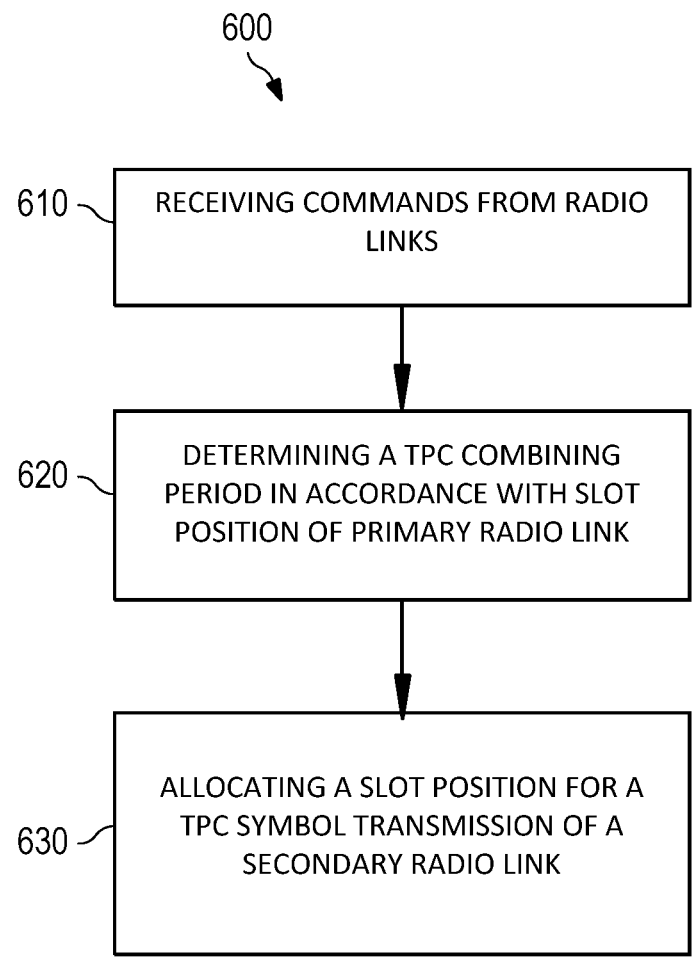
FIG. 6 illustrates a flow diagram of TPC position allocating method.
Figure 7:
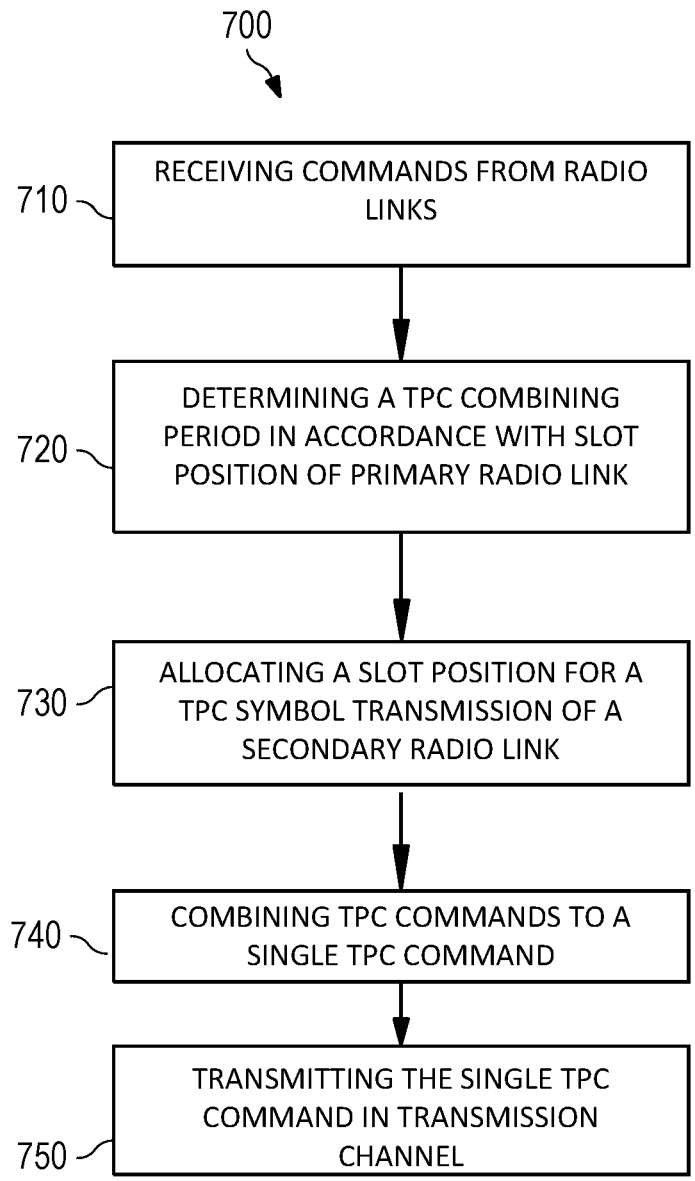
FIG. 7 illustrates a flow diagram of TPC position allocating method.

FIGS. 6-7 illustrates a flow diagram of TPC position allocating method 600, 700 according to example embodiments described herein.

In FIG. 6 a method 600 is described that includes receiving commands from radio links 610, determining a TPC combining period in accordance with slot position of primary radio link 620, and allocating a slot position for a TPC symbol transmission of a secondary radio link 630.

In FIG. 7, a method 700 is disclosed that includes receiving commands from radio links 710, determining a TPC combining period in accordance with slot position of primary radio link 720, and allocating a slot position for a TPC symbol transmission of a secondary radio link 730. FIG. 7 also includes combining TPC commands to a single TPC command and transmitting the single TPC command 740 in a transmission channel 750.

The method 600, 700 for transmit power control (TPC) transmission slot assignment includes receiving 610, 710 one or more TPC commands from two or more radio links, wherein at least a primary radio link and a secondary radio link are among the two or more radio links; determining a TPC combining period in accordance with a primary slot position, wherein a primary TPC symbol transmission of the primary radio link is present at the primary slot position; allocating a secondary slot position for a secondary TPC symbol transmission of the secondary radio link in accordance with the TPC combining period.

Preferably, the primary radio link is an existing radio link, and the secondary radio link is added later.

Preferably, when the primary and the secondary radio links are configured with Algorithm 3, the method may further include receiving the TPC command of the secondary radio link in the TPC combining period, wherein the TPC combining period is determined by the primary slot position carrying the primary TPC symbol transmission. Optionally the TPC combining period exists before the receiving.

Preferably, the method may further include configuring at least one of the primary radio link and the secondary radio link with Algorithm 3, wherein the TPC combining period exists only once in each slot cycle, wherein the secondary slot position for the secondary TPC symbol transmission of the secondary radio is within the TPC combining period.

Preferably, the method may further include determining a first slot position from which the TPC combining period starts in accordance with the primary slot position.

Optionally, when the position in accordance with the TPC combining period is available for the secondary TPC symbol transmission of the secondary radio link, a code to transmit the secondary symbol is used as same as the code used in the primary radio link.

Optionally, the method may further include transmitting the secondary TPC command of the secondary radio link not at the same time as transmitting the primary TPC command of the primary radio link.

Figure 8:
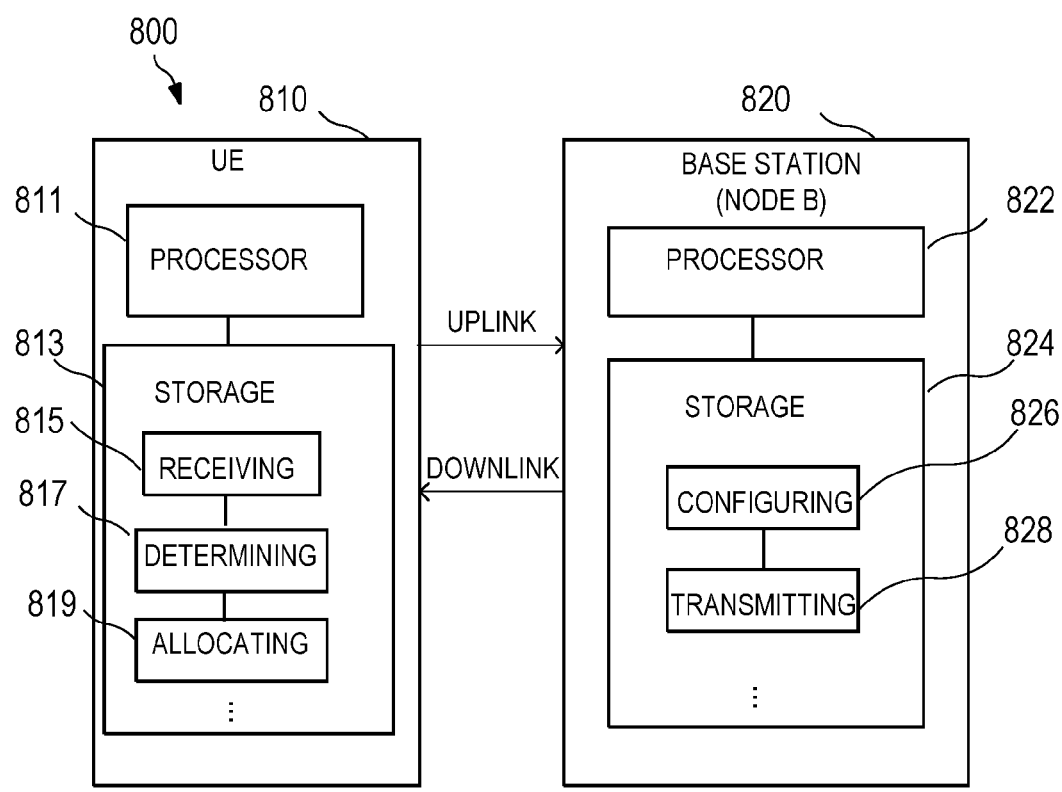
FIG. 8 illustrates a block diagram of a system of TPC transmission including a UE and a radio base station or a NodeB.

FIG. 8 illustrates a block diagram of a system 800 of TPC transmission including a UE 810 and a radio base station or a NodeB 820.

The UE 810 performing transmit power control (TPC) transmission slot assignment, includes a processor 811; and a non-transitory computer readable storage medium 813 storing programming for execution by the processor, the programming including instructions for: receiving 815 one or more TPC commands from two or more radio links, wherein at least a primary radio link and a secondary radio link are among the two or more radio links; determining 817 a TPC combining period in accordance with a primary slot position, wherein a primary TPC symbol transmission of the primary radio link is present at the primary slot position; allocating 819 a secondary slot position for a secondary TPC symbol transmission of the secondary radio link in accordance with the TPC combining period.

Preferably, the primary radio link is an existing radio link, and the secondary radio link is added later. When the primary and the secondary radio links are configured with Algorithm 3, wherein the programming further includes instructions for: receiving the TPC command of the secondary radio link in the TPC combining period, wherein the TPC combining period is determined by the primary slot position carrying the primary TPC symbol transmission.

Preferably, wherein the programming further includes instructions for: configuring at least one of the primary radio link and the secondary radio link with Algorithm 3, wherein the TPC combining period exists only once in each slot cycle, wherein the secondary slot position for the secondary TPC symbol transmission of the secondary radio is within the TPC combining period.

Preferably, wherein the programming further includes instructions for: determining a first slot position from which the TPC combining period starts in accordance with the primary slot position.

The radio base station or Node B 820 performing transmit power control (TPC) transmission slot assignment, includes a processor 822; and a non-transitory computer readable storage medium 824 storing programming for execution by the processor, the programming including instructions for: being configured to transmit a TPC command in a first slot position; transmitting the TPC command in a third slot position in accordance with a TPC combining period, wherein the TPC combining period is determined in accordance with a primary slot position, wherein a primary TPC symbol transmission of the primary radio link is present at the primary slot position.

Preferably, wherein the programming further includes instructions for transmitting the TPC command in the third slot position in accordance with configuration of Algorithm 3.

Preferably, wherein the programming further includes instructions for transmitting the TPC command of a secondary radio link in a second slot position in accordance with the TPC combining period, wherein the TPC combining period is associated to the primary link and determined by the primary slot position.

Preferably, wherein the programming further includes instructions for transmitting the TPC command of a secondary radio link in a second slot position in accordance with a TPC combining period, wherein the TPC combining period exists only once in each slot cycle, wherein the secondary slot position for the secondary TPC symbol transmission of the secondary radio is within the TPC combining period.

Preferably, wherein one or more TPC commands for one or more radio links are configured for transmitting in accordance with the TPC combining period, and a secondary slot position for a secondary TPC symbol transmission of a secondary radio link is allocated in accordance with the TPC combining period; and the programming further includes instructions for transmitting the one or more TPC commands.

Optionally, wherein a secondary slot position for a secondary TPC symbol transmission of the secondary radio link is allocated in accordance with the TPC combining period.

Optionally, the first slot position and the third slot position can be the same or different slot position.

Optionally, one or more TPC commands for one or more radio links are configured for transmitting in accordance with the TPC combining period, and a secondary slot position for a secondary TPC symbol transmission of a secondary radio link is allocated in accordance with the TPC combining period; and the programming further includes instructions for transmitting the one or more TPC commands.

Optionally, wherein the programming further includes instructions for: transmitting the TPC command in the third slot position in accordance with the configuration of Algorithm 3.

Optionally, wherein the programming further includes instructions for: transmitting the TPC command of the secondary radio link in a second slot position in accordance with a TPC combining period, wherein the TPC combining period is associated to the primary link and determined by the primary slot position.

Optionally, the TPC combining period exists before the transmitting of the secondary radio link.

Optionally, wherein the programming further includes instructions for: transmitting the TPC command of the secondary radio link in a second slot position in accordance with a TPC combining period, wherein the TPC combining period exists only once in each slot cycle, wherein the secondary slot position for the secondary TPC symbol transmission of the secondary radio is within the TPC combining period.

Optionally, wherein the programming further includes instructions for: determining a first slot position from which the TPC combining period starts in accordance with the primary slot position.

Figure 9:
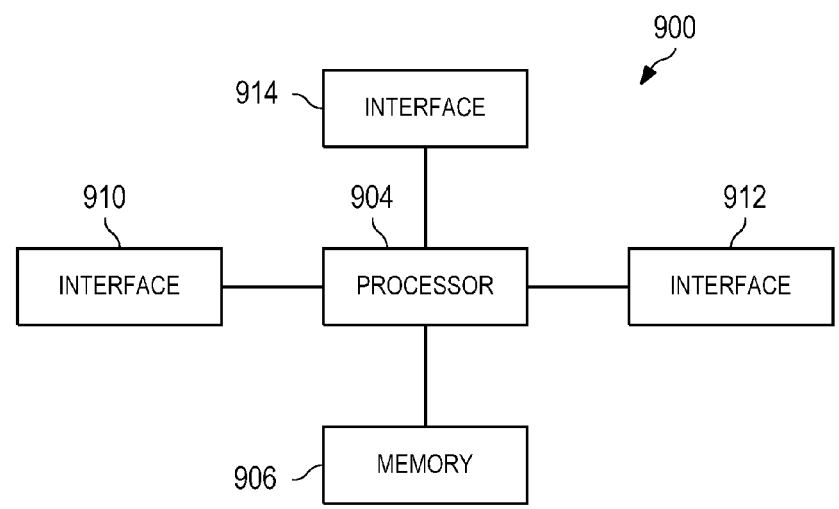
FIG. 9 is a block diagram of an embodiment processing system that may be used for implementing the devices and methods disclosed herein.

FIG. 9 illustrates a block diagram of an embodiment processing system 900 for implementing the devices and methods disclosed herein, which may be installed in a host device. As shown, the processing system 900 includes a processor 904, a memory 906, and interfaces 910-914, which may (or may not) be arranged as shown in the figure. The processor 604 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in the figure, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smart watch, etc.), or any other device adapted to access a telecommunications network.

In some embodiments, one or more of the interfaces 910, 912, 914 connects the processing system 900 to a transceiver adapted to transmit and receive signaling over the telecommunications network.

Figure 10:
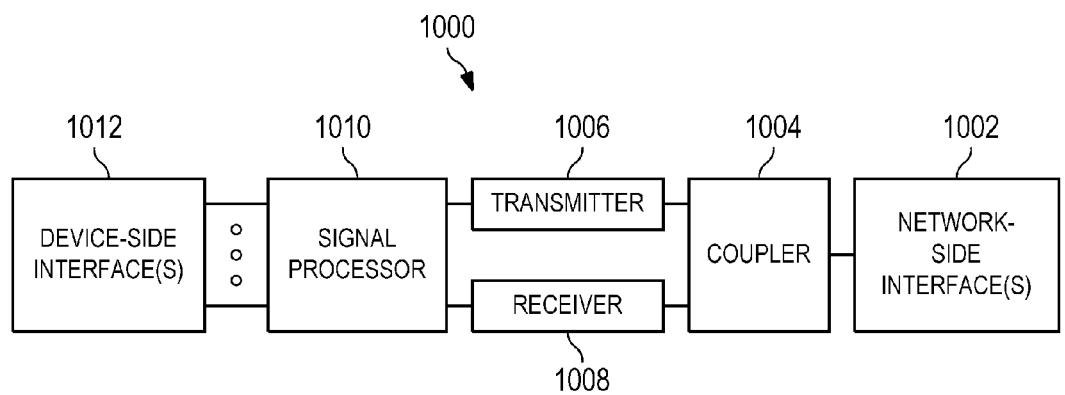
FIG. 10 illustrates a block diagram of a telecommunication system according to example embodiments described herein.

FIG. 10 illustrates a block diagram of a telecommunication system. The system includes a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 600, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In some embodiments, a UE 310, 810 connects with one or more of the interfaces 910, 912, 914 connects the processing system 900 to a transceiver adapted to transmit and receive signaling over the telecommunications network. The UE 310, 810 performing transmit power control (TPC) transmission slot assignment as disclosed in above embodiments.

In some embodiments, a base station or a NodeB 320, 820 connects with one or more of the interfaces 910, 912, 914 connects the processing system 900 to a transceiver adapted to transmit and receive signaling over the telecommunications network. The NodeB 320, 820 performing transmit power control (TPC) transmission as disclosed in above embodiments.

In some embodiments, a UE 310, 810 and a NodeB 320, 820 as disclosed in above embodiments that communicate with each and connecting with one or more of the interfaces 910, 912, 914 connecting the processing system 900 to a transceiver adapted to transmit and receive signaling over the telecommunications network.

The following references are related to subject matter of the present application. Each of these references is incorporated herein by reference in its entirety:

3GPP TS 25.211 v12.1.0, "Physical channels and mapping of transport channels onto physical channels (FDD)" (Dec. 2014).

3GPP TS 25.214 v13.0.0 "Physical layer procedures (FDD)" (Sep. 2015).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method implemented by a user equipment (UE) the method comprising:
   receiving from a primary radio link a primary transmission power control (TPC) command wherein the primary TPC is received in a primary slot position of a frame;
   determining a slot position within the frame for a TPC combining period based on the primary slot position; and
   allocating a secondary slot position within the TPC combining period for a secondary TPC symbol transmission of a secondary radio link.

2. The method of claim 1, wherein determining the slot position with the frame for the TPC combining period comprises:
   identifying a respective slot format for the primary radio link and for the secondary radio link;
   based on the identified slot formats, determining the slot position for the TPC combining period.

3. The method of claim 1, further comprising:
if the slot format for the primary radio link is {9, 0}:
- if the slot format for the secondary radio link is {1 . . . 8}, then the slot position for the TPC combining period is the third slot; and
- if the slot format for the secondary radio link is {9, 0}, then the slot position for the TPC combining period is the first slot.

4. The method of claim 1, further comprising:
if the slot format for the primary radio link is {1 . . . 8}:
- if the slot format for the secondary radio link is {1 . . . 8}, then the slot position for the TPC combining period is the first slot; and
- if the slot format for the secondary radio link is {9, 0}, then the slot position for the TPC combining period is the second slot.

5. The method of claim 1 wherein the TPC combining period occurs once in each frame.

6. The method of claim 5 wherein the frame is a fractional dedicated physical channel (F-DPCH) frame.

7. The method of claim 1, further comprising:
receiving a secondary TPC command from the second radio link during the TPC combining period; and
adjusting a transmit power of the UE based on the primary and secondary TPC commands.

8. The method of claim 7, wherein the secondary TPC command is received at a time offset within the TPC combining period that is different from a time offset within the TCP combining period that the primary TPC command is received.

9. A user equipment (UE) comprising:
one or more processors; and
a non-transitory computer readable storage medium storing instructions that, when executed by the one or more processors, cause the processor to perform the steps of:
receiving from a primary radio link a primary transmission power control (TPC) command wherein the primary TPC is received in a primary slot position of a frame; determining a slot position within the frame for a TPC combining period based on the primary slot position; and
allocating a secondary slot position within the TPC combining period for a secondary TPC symbol transmission of a secondary radio link.

10. The UE of claim 9, wherein determining the slot position with the frame for the TPC combining period comprises:
identifying a respective slot format for the primary radio link and for the secondary radio link;
based on the identified slot formats, determining the slot position for the TPC combining period.

11. The UE of claim 9, further comprising:
if the slot format for the primary radio link is {9, 0}:
- if the slot format for the secondary radio link is {1 . . . 8}, then the slot position for the TPC combining period is the third slot; and
- if the slot format for the secondary radio link is {9, 0}, then the slot position for the TPC combining period is the first slot.

12. The UE of claim 9, further comprising:
if the slot format for the primary radio link is {1 . . . 8}:
- if the slot format for the secondary radio link is {1 . . . 8}, then the slot position for the TPC combining period is the first slot; and
- if the slot format for the secondary radio link is {9, 0}, then the slot position for the TPC combining period is the second slot.

13. The UE of claim 9, wherein the TPC combining period occurs once in each frame.

14. The UE of claim 13, wherein the frame is a fractional dedicated physical channel (F-DPCH) frame.

15. The UE of claim 9, further comprising:
receiving a secondary TPC command from the second radio link during the TPC combining period; and
adjusting a transmit power of the UE based on the primary and secondary TPC commands.

16. The UE of claim 9, wherein the secondary TPC command is received at a time offset within the TPC combining period that is different from a time offset within the TCP combining period that the primary TPC command is received.

* * * * *